US011275951B2

(12) United States Patent
Carmichael

(10) Patent No.: US 11,275,951 B2
(45) Date of Patent: Mar. 15, 2022

(54) SURVEILLANCE DRONE WITH MICROBOTS

(71) Applicant: Connie Jordan Carmichael, Laguna Niguel, CA (US)

(72) Inventor: Connie Jordan Carmichael, Laguna Niguel, CA (US)

(*) Notice: Subject to any disclaimer, the term of this patent is extended or adjusted under 35 U.S.C. 154(b) by 21 days.

(21) Appl. No.: 16/539,948

(22) Filed: Aug. 13, 2019

(65) Prior Publication Data

US 2020/0065590 A1 Feb. 27, 2020

Related U.S. Application Data

(60) Provisional application No. 62/721,476, filed on Aug. 22, 2018.

(51) Int. Cl.
*G06K 9/00* (2006.01)
*B64C 39/02* (2006.01)
*B64D 47/08* (2006.01)

(52) U.S. Cl.
CPC ........ *G06K 9/00771* (2013.01); *B64C 39/024* (2013.01); *B64D 47/08* (2013.01); *G06K 9/0063* (2013.01); *G06K 9/00221* (2013.01); *B64C 2201/127* (2013.01); *B64C 2201/141* (2013.01); *G06K 2209/25* (2013.01)

(58) Field of Classification Search
CPC .......... G06K 9/00771; G06K 9/00221; G06K 9/0063; G06K 2209/25; B64C 39/024; B64C 2201/127; B64C 2201/141; B64C 2201/042; B64C 2201/123; B64D 47/08

USPC .......................................................... 382/103
See application file for complete search history.

(56) References Cited

U.S. PATENT DOCUMENTS

| | | | |
|---|---|---|---|
| 2016/0200438 A1* | 7/2016 | Bokeno | B60L 53/53 244/2 |
| 2017/0050749 A1* | 2/2017 | Pilskalns | B60L 53/36 |
| 2017/0344000 A1* | 11/2017 | Krishnamoorthy | B64C 39/024 |
| 2018/0107210 A1* | 4/2018 | Harnett | B64D 1/02 |
| 2018/0178665 A1* | 6/2018 | Chen | H02J 7/0042 |
| 2018/0245365 A1* | 8/2018 | Wankewycz | H02J 7/00 |
| 2018/0261112 A1* | 9/2018 | O'Brien | G05D 1/0094 |
| 2018/0278801 A1* | 9/2018 | Ohno | G06Q 50/00 |
| 2018/0290764 A1* | 10/2018 | Mcmillian | G08G 5/0026 |
| 2018/0311824 A1* | 11/2018 | Wada | B25J 13/08 |
| 2018/0312069 A1* | 11/2018 | McClymond | B64C 25/52 |
| 2018/0354622 A1* | 12/2018 | Raffler | G05D 1/0038 |
| 2019/0156121 A1* | 5/2019 | Kucharski | G01C 21/20 |
| 2019/0359329 A1* | 11/2019 | Gavrilov | B08B 3/024 |
| 2020/0017218 A1* | 1/2020 | Ahmad | B64D 1/08 |
| 2020/0239160 A1* | 7/2020 | Cheng | B64F 1/005 |
| 2020/0242984 A1* | 7/2020 | Salem | G05D 1/104 |
| 2020/0244087 A1* | 7/2020 | Yang | H02J 7/0042 |
| 2020/0283136 A1* | 9/2020 | Nguyen | B64C 39/024 |

(Continued)

*Primary Examiner* — Jerome Grant, II
(74) *Attorney, Agent, or Firm* — Law Office of Scott C Harris, Inc

(57) ABSTRACT

A drone which carries out surveillance by surveilling the user's property. Items in the property can be mapped by the drone. People come on the property can be imaged, and use image processing to compare the image of the people with known images of known people. An alarm can because when an unknown person comes. When the packages delivered, the drone can carry out surveillance on the package, including imaging the outside of the package in the inside of the package.

2 Claims, 3 Drawing Sheets

(56) References Cited

U.S. PATENT DOCUMENTS

| | | | |
|---|---|---|---|
| 2020/0290752 A1* | 9/2020 | Kolosiuk | B64F 1/362 |
| 2020/0354059 A1* | 11/2020 | Newman | B60L 53/12 |
| 2020/0361324 A1* | 11/2020 | Evans | B61B 3/02 |
| 2020/0394898 A1* | 12/2020 | Roberts | G08B 25/014 |
| 2021/0031947 A1* | 2/2021 | Wankewycz | B64D 27/24 |
| 2021/0039781 A1* | 2/2021 | Yao | B64C 39/024 |

\* cited by examiner

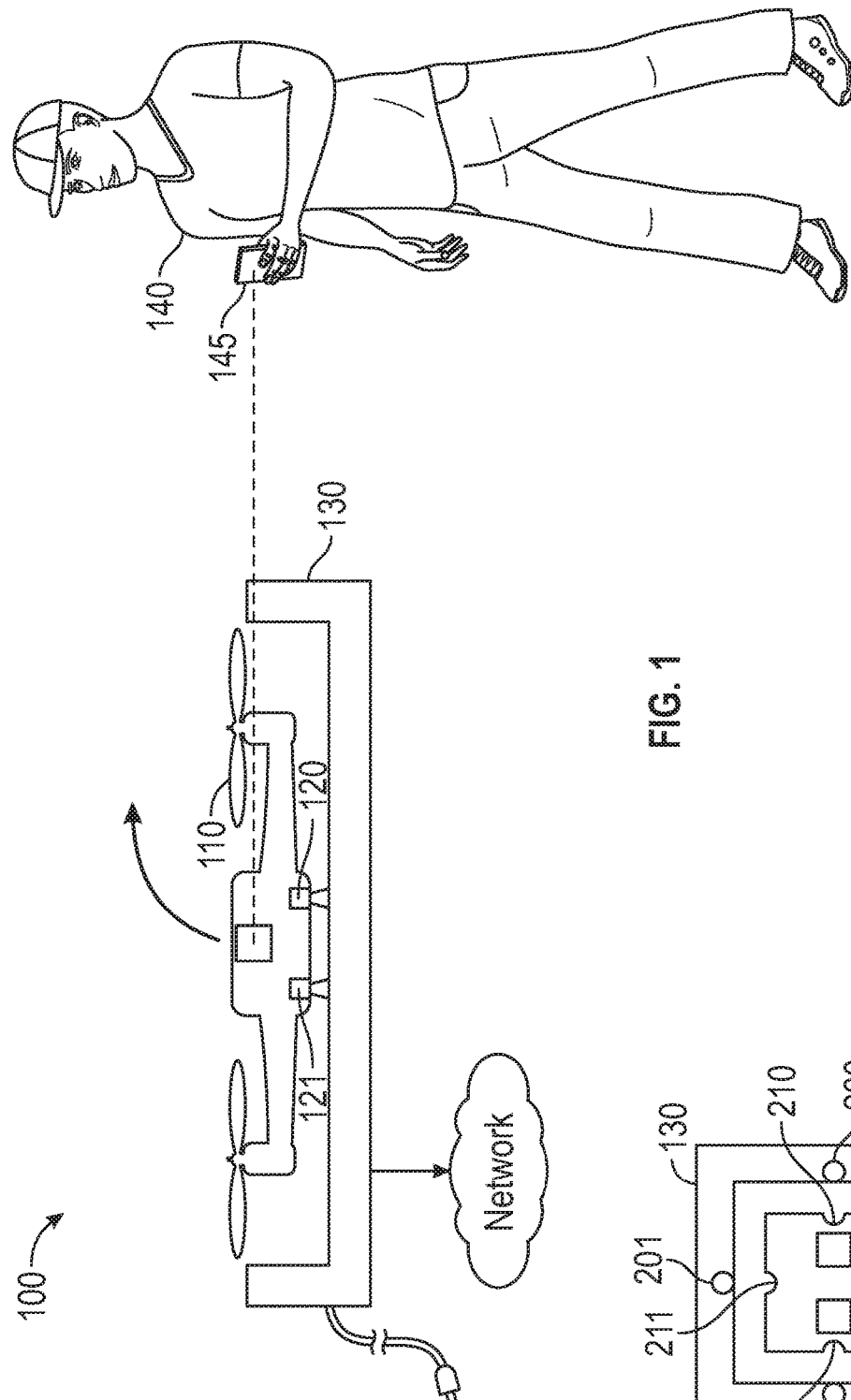
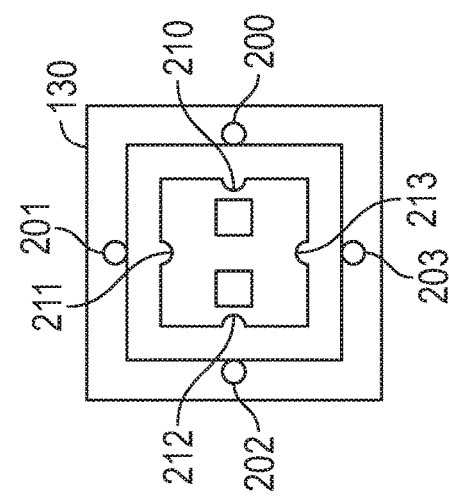
FIG. 1
FIG. 2

SURVEILLANCE DRONE WITH MICROBOTS

This application claims priority from provisional Ser. No. 62/721,476, filed 22 Aug. 2018, the entire contents of which are herewith incorporated by reference.

BACKGROUND

Drones have become very common as devices which are able to be remotely controlled to fly to various locations, and photograph their surroundings using an onboard camera.

A conventional drone control requires the user to control the drone from a remote control.

SUMMARY OF THE INVENTION

The present application describes a special drone with downloadable software, that allows the drone to carry out various kinds of surveillance operations, as described herein.

BRIEF DESCRIPTION OF THE DRAWINGS

In the Drawings:

FIG. 1 shows a drone as controlled according to the present application;

FIG. 2 shows a diagram of the langing pad;

DETAILED DESCRIPTION

Figure 3:
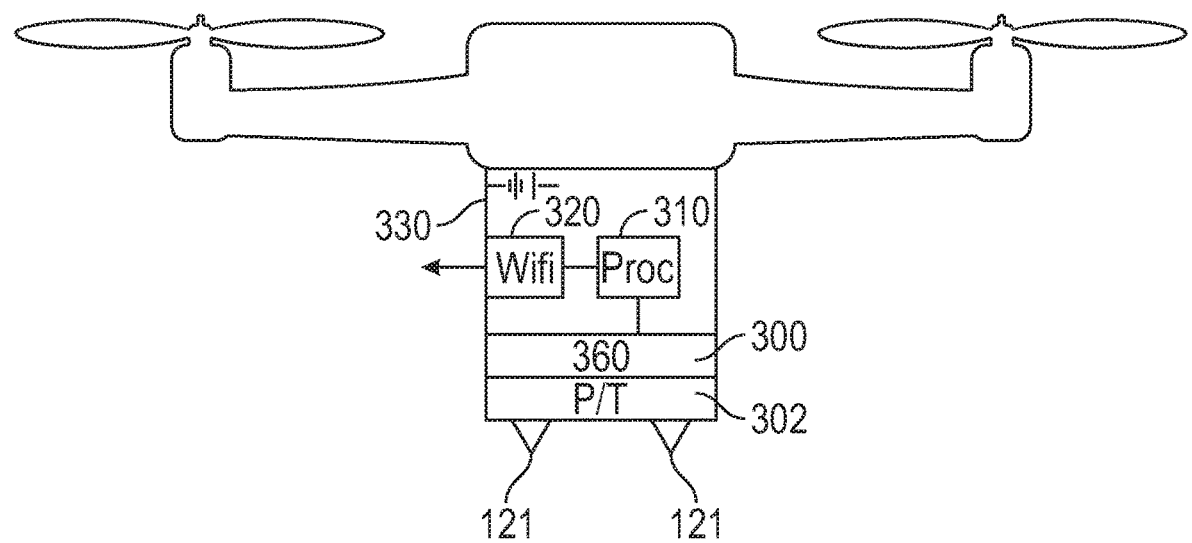
FIG. 3 shows a block diagram of a drone.

An embodiment describes a special drone that allows special functions. In an embodiment, the drone 100 has flying capability by virtue of one or more rotating propeller 110, controlled as conventional with an internal power source, e.g., a battery, and a remote control capability. The drone also includes external charging contacts 120, 121 which connect to contacts 131, 132 in a drone docking station 130. The drone 100 can land in the docking station 130 as described herein, and recharge, so that it is ready to fly when needed.

The docking station includes special positioning parts 200, 201, 202, 203 (shown in FIG. 2) which enable the drone 100 to center itself properly in between those positioning parts on to the docking station, as described herein, so that the contacts 120, 121 on the drone, connect to the contacts 131, 132 on the docking station 130. In one embodiment, the positioning parts 200-203 can be light emitting diodes such as visible or infrared LEDs whose radiation is received by corresponding receivers on the outside edge of the drone. For example, there can be a receiver 210 on the drone that receives the radiation from the LED 200, and similarly 211, 212, 213. By finding the location of maximum reception of all the different receivers, the drone can be properly centered on to the drone docking station 130.

Other contact finding techniques can alternately be used.

The drone itself, as shown in block diagram form in FIG. 3, includes a 360 degree camera 300 as its bottom part, which also includes lens groups 302 which enable pan and tilt of the direction of the 360° camera. In one embodiment, the 360° camera can also be moved itself in pan and tilt directions. The output of the camera is connected to the drone's processor 310 which connects via Wi-Fi to either the docking station or to another Wi-Fi station 320. Processor 310 can also carry out the flowchart shown in FIG. 4 and described herein.

A large part of the interior size and depth of the drone is taken up by the internal battery 330 which is also connected to the contacts 120, 121, so that the battery is automatically charged when the drone is docked.

When the drone is docked, it also receives automatically instructions which can be from the Internet, can be customized, or from a user cell phone. The instructions instruct the drone on specifically what function the drone should carry out. Different embodiments of the functions that can be programmed for the drone are explained herein as the different functions.

In one embodiment, the drone can self-dock when necessary to recharge, for when it is not needing any particular operation. The drone can automatically lift off when necessary, to carry out one of its functions.

In one embodiment, the drone also includes a heat sensing sensor, so that the drone will not take off if a person is close enough to the drone for the drone to be a possible danger, for example when a person is within 3 feet of the drone.

The drone can also include micro bots shown generically as 350, which are held within the drone and can be released from the drone to carry out an additional function, such as additional surveillance.

The drone includes motion sensors to detect its position. The drone can use its camera to read barcodes, QR codes, Near Field Codes (NFCs), and holograms, e.g., from a user or from a package.

Figure 4:
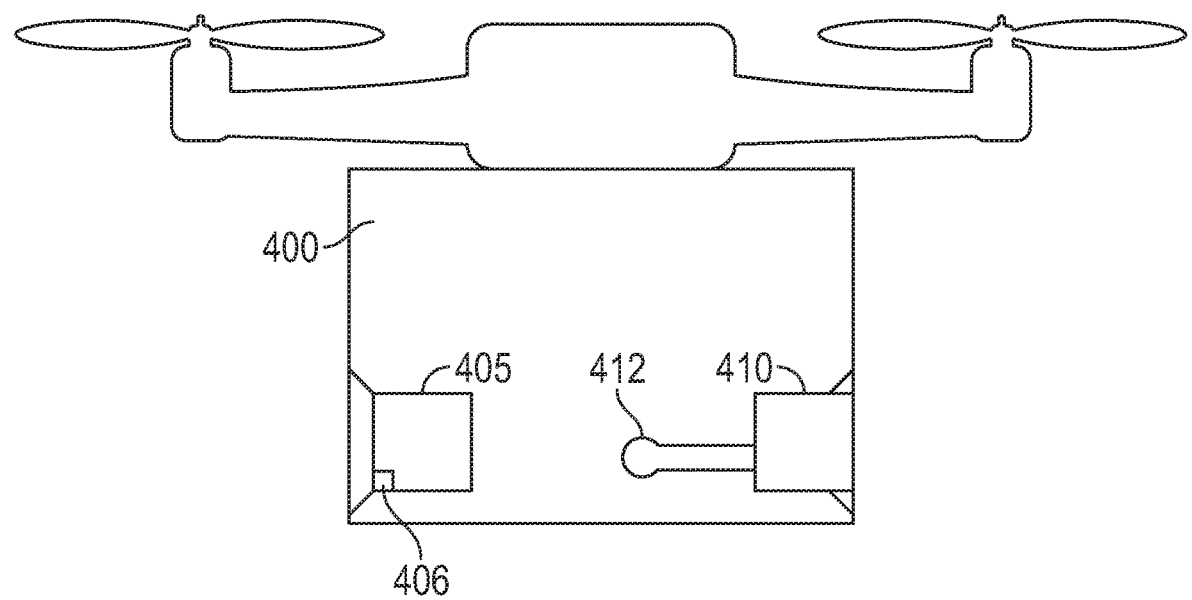
FIG. 4 shows a block diagram of a drone with bots in the drone.
Figure 5:
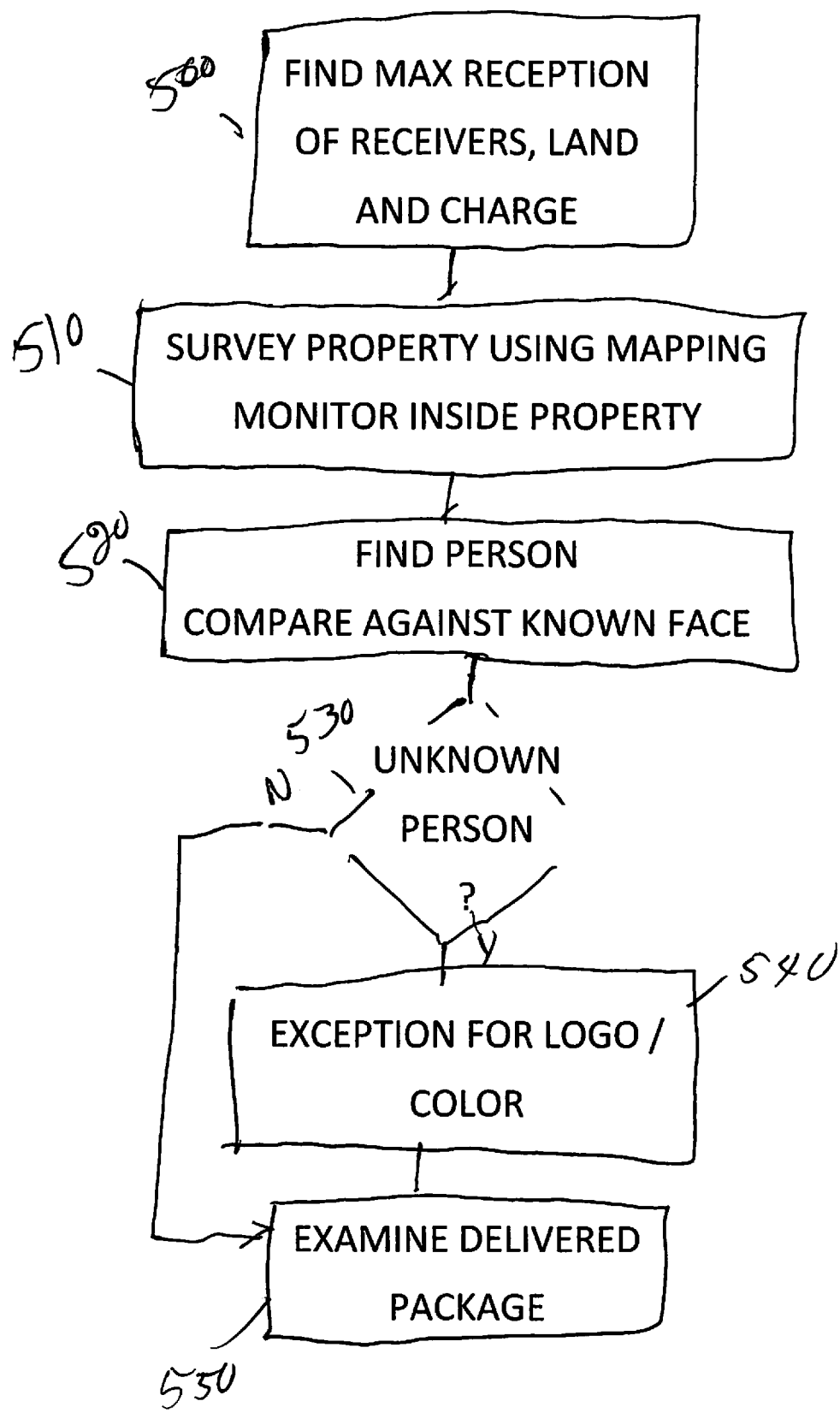
FIG. 5 shows a flowchart of examining a delivered package.

FIG. 4 shows a flowchart, which initially shows the drone finding the maximum reception of all the different receivers at 400 landing in charging. After charging the drone can be navigating according to a map, such as Google maps. The drone can use Google maps to determine the user/owner's property extent shown as 410 and use geo-fencing and geo-targeting of its operation. In one embodiment, the drone surveils only within the user's property. In another embodiment, the drone also monitors actions outside the property.

The drone can use its camera for facial recognition of an owner, or people who the owner knows that have been incorporated into the drone. The drone can also detect objects and logos as needed.

For example, in one embodiment, the drone can use a mapping program to determine and surveil upon the entire outside parameters of the user's property shown as 410 FIG. 4. Different items on the user's property can be mapped by the drone. For example, when a person comes onto the property, that person can be compared against a list of known faces that the drone has previously stored at 420 . Any other person, not on the known face list are detected at 430 and can cause an alarm if the drone is programmed to alarm on unknown people. Exceptions can also be set by the user, according to different logos and uniforms that a person might wear at 440. For example, the logos and color scheme on a UPS uniform can be automatically recognized, allowing the system to conclude that the unknown person is a UPS delivery person and thus avoid the alarm.

The drone can also carry out many different applications. The above has described using the drone for surveillance, however it can also be used for different aspects of security, for example flying around the property once every interval (for example every hour) to look for open windows open doors or other security issues.

The drone can also be used to search for fires. For example, during the once an hour fly around the property, the drone can correlate over the image it sees through its camera to look for a temperature greater than 200° or to look for smoke.

In another application, the drone can be used for search and rescue during fires.

The drone can be programmed to automatically interact with the home and commercial building security system and fire system, doorbells and controls.

Different examples of uses are described herein. According to a first use, the maps application running in the drone automatically sets the property lines of the user's house. The user can set the drone to surveillance. In the surveillance mode, either the drone itself or other video cameras monitor for motion. The drone may fly once per hour or when motion is detected by another device. All of the motion that is monitored for needs to be within the users geo-fenced property. When motion of this type is detected, or if no motion is detected at every interval of time, the drone is automatically requested to take off, and fly towards the detected motion.

The drone can have stealth capability, so that can quietly approach to avoid causing people from hiding from the drone. Alternatively, the drone can operate from a height so that the object being surveilled might not necessarily know that the drone is following it. However, the movable cameras and 360° cameras enable finding and monitoring most people. In this way, an intruder once identified can be followed.

In an embodiment, the drone can leave the property once an intruder has been identified, to follow the intruder, can capture the vehicle license plates and vehicle description and photos of the intruder.

In another embodiment, the person being monitored, shown as 140 in FIG. 1 can be supplied with a tag 145. The drone will automatically follow the location of the tab from room to room and also follow the person should they leave the premises. For example, an elderly person who wanders away could be followed by the drone in this way.

This embodiment can also operate without a tag, by using facial recognition and tracking the person being facially recognized. As another example, the drone can be trained to recognize a person's walking style, and can recognize the person when walking even if they cannot see the face This can be used for police work, a suspected intruder or explosives or chemicals. In this case, the drone can include a chemical sniffer.

When geo-targeting, areas around the perimeter of the building or home can be viewed.

Another embodiment describes using the drone as part of a doorbell app. In this embodiment, the drone interacts with the electronic doorbell system. When a person rings the doorbell, the drone is automatically caused to take off, and provide surveillance video of the area at the door to the person running the app. This could tie the drone into a doorbell application causing the drone to automatically begin flying when the doorbell rings. When the app's function is completed, the drone returns to its docking station, and lands to recharge.

When the device includes facial recognition, the person's vehicles and animals entering the geo-fenced perimeter can be automatically identified and information about them is sent to either the owner or to some security system. The security service provider may also monitor and control the drone's activities.

For other police work, this can be used to identify or chase a subject, approach a package or approaching vehicle and search a vehicle. This can also be used to search packages, rooms, containers areas and buildings.

In another embodiment, the drone can be used to monitor delivery, in one embodiment as part of a delivery system. Delivery can be verified at 450 by viewing the packages and barcodes and logging the barcodes by scanning with the camera, to double check using the drone, that delivery has been done correctly. This can be used by the delivery company to make sure that people making the delivery do so according to the standards of the delivery company. The drone can be put into stealth mode as discussed above, and can monitor the delivery people delivering the packages, and can also monitor the location where the package has been left after delivery.

In another embodiment, The drones can be used to view and map areas, to form better mapping applications.

Once alerted by the security system, the drone can automatically perform compulsory actions as described above, such as taking better photos of the people in the area, monitoring the people in the area, and the like. The drone can also be responsive to certain alarms such as the carbon monoxide alarm, the smoke alarm, and the like. The drone can either sense the conventional audio beep from these devices, or can be tied in to an electronic alarm via Wi-Fi or Bluetooth. In one embodiment, the drone can also operate under water, to search and detect underwater risks.

In another embodiment, illustrated in FIG. 4, the drone body 400 includes areas which hold and removably house one or more micro bots (or nano bots) that are housed inside the drone, and charged by the drone battery. In FIG. 4, there are two micro bots 405 and 410 inside the drone. These are held within the drone, and can be released from the drone when the drone is landed. The micro bots each include a camera, with the camera 406 shown on the drone 405. The micro bots can be wheeled machines that can exit the drone to investigate various parts. For example, if a box is left on the front step that is suspicious in nature, the micro bot can search inside the box. In one embodiment, the camera 406 can be on a probe end, and that probe can be inserted into the box through the box packaging to explore the inside of the box and attempt to image any suspicious objects inside the box. The bot 410 includes a camera 412 that is on such a probe. Any of these bots can retract back into the drone body 410.

Preferably, the micro bots or nano bots are located in two symmetrical locations within the drone to avoid unbalancing the drone.

In one embodiment, after a package is left, the surveillance drone may continue to surveil the object until the authorized user picks up the package. This is a special embodiment of this invention: that the drone not only monitors the delivery of the package, it monitors after the package is delivered, and can use the microbots or nano bots to examine the inside of the package, if the package is deemed suspicious.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A surveillance drone, comprising:

a flying drone, which operates using power from an internal battery, to allow flying the drone based on a programmable control, the drone having electrical contacts which allow charging the battery, wherein the drone also includes a camera which obtains a picture over 360° and processes an image from the camera; and a drone base, having charging contacts, the charging contacts being in a similar pattern to the electrical contacts on the drone, the drone base and having structure enabling the flying drone to automatically land on the drone base in a location where the drone is charged via its electrical contacts from the charging contacts on the drone, wherein the drone uses a processor for carrying out surveillance over an area, wherein the drone runs a mapping program that determines a perimeter of a user's property, and carries out surveillance within the perimeter, wherein the camera is a pan and tilt movable camera, and the processor in the drone runs a routine which automatically determines people who are on the user's property, and compares and obtains images of the people on the user's property and compares the images to known images using image processing to determine people who are not authorized to be on the property, and automatically takes an action when finding an unauthorized person, wherein the image processing compares a logo on a uniform against known logos on uniforms to determine a package delivery person, wherein the drone automatically surveils packages which are left on the property, wherein the drone also includes micro bots, which are smaller than the drone, and which are stored in the drone and are electrically recharged when stowed in the drone, and where the micro bots have a function to leave the drone and to carry out an action based on results of the surveillance, wherein the micro bots include a camera on a probe, and the micro bots automatically insert the probe into a package to obtain an image of an inside of the package.

2. The drone as in claim 1, wherein the image processing compares faces against known faces.

* * * * *